US012277877B1

(12) United States Patent
Aogaki et al.

(10) Patent No.: US 12,277,877 B1
(45) Date of Patent: Apr. 15, 2025

(54) DEVICE AND METHOD FOR CHROMATIC ABERRATION CORRECTION

(71) Applicant: Synaptics Incorporated, San Jose, CA (US)

(72) Inventors: Kazutoshi Aogaki, Kanagawa (JP); Hirobumi Furihata, Tokyo (JP); Takashi Nose, Kanagawa (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 18/474,480

(22) Filed: Sep. 26, 2023

(51) Int. Cl.
*G09G 1/00* (2006.01)
*G09G 3/00* (2006.01)
*G09G 3/20* (2006.01)

(52) U.S. Cl.
CPC ........... *G09G 3/001* (2013.01); *G09G 3/2007* (2013.01); *G09G 2320/0242* (2013.01); *G09G 2320/0673* (2013.01); *G09G 2340/045* (2013.01)

(58) Field of Classification Search
CPC ................. G09G 3/001; G09G 3/2007; G09G 2320/0242; G09G 2320/0673
See application file for complete search history.

(56) References Cited

U.S. PATENT DOCUMENTS

| | | | | |
|---|---|---|---|---|
| 6,536,907 | B1 * | 3/2003 | Towner | H04N 25/00 396/149 |
| 2005/0156817 | A1 * | 7/2005 | Iba | G02B 27/0093 345/8 |
| 2018/0136720 | A1 * | 5/2018 | Spitzer | G06T 1/20 |
| 2019/0156466 | A1 * | 5/2019 | Cho | G06F 1/163 |
| 2019/0355105 | A1 * | 11/2019 | Rasmusson | G06T 5/80 |
| 2021/0063732 | A1 * | 3/2021 | Kajita | G02B 27/0025 |
| 2024/0087101 | A1 * | 3/2024 | Ikenoue | G06T 9/00 |

* cited by examiner

*Primary Examiner* — Sanghyuk Park
(74) *Attorney, Agent, or Firm* — Leydig, Voit & Mayer, Ltd.

(57) ABSTRACT

A display driver IC includes a chromatic aberration correction (CAC) circuit and a drive circuit. The CAC circuit is configured to receive a first input color plane for a first color. The first input color plane includes a center region and a peripheral region that surrounds the center region of the first input color plane. The CAC circuit is further configured to generate an output color plane. The output color plane includes a center region and a scaled peripheral region that surrounds the center region of the output color plane. The center region of the output color plane is the same as the center region of the first input color plane. The scaled peripheral region is generated by scaling the peripheral region. The drive circuit is configured to update a display panel based on the output color plane.

23 Claims, 16 Drawing Sheets

DEVICE AND METHOD FOR CHROMATIC ABERRATION CORRECTION

TECHNICAL FIELD

This disclosure relates generally to display devices, and more particularly to color aberration correction for display devices.

BACKGROUND

Some panel display devices may be configured so that the user views the image on the display panel through a lens. One example is a head mounted display (HMD) device. An HMD device may include one or more display panels positioned in front of one or both eyes of the user. Because the one or more display panels of the HMD device are positioned in close proximity to the user's eyes, one or more lenses may be disposed between the user's eyes and the one or more display panels to enlarge the field of view of the HMD device. The use of the one or more lenses facilitates provision of an immersive experience to the user of the HMD device. As such, HMD devices with lenses are well suited for extended reality (XR) applications (including virtual reality (VR), augmented reality (AR), and merged reality (MR), among others).

SUMMARY

This summary is provided to introduce a selection of concepts in a simplified form that are further described below. This summary is not intended to necessarily identify key features or essential features of the present disclosure. The present disclosure may include the following various aspects and embodiments.

In an exemplary embodiment, the present disclosure provides a display driver integrated circuit (IC). The display driver IC includes a chromatic aberration correction (CAC) circuit and a drive circuit. The CAC circuit is configured to receive a first input color plane for a first color. The first input color plane includes a center region and a peripheral region that surrounds the center region of the first input color plane. The CAC circuit is further configured to generate an output color plane. The output color plane includes a center region and a scaled peripheral region that surrounds the center region of the output color plane. The center region of the output color plane is the same as the center region of the first input color plane. The scaled peripheral region is generated by scaling the peripheral region. The drive circuit is configured to update a display panel based on the output color plane.

In another exemplary embodiment, the present disclosure provides a display device. The display device includes a display panel, a lens, a CAC circuit, and a drive circuit. The lens is disposed in front of the display panel. The CAC circuit is configured to receive a first input color plane for a first color that includes a center region and a peripheral region that surrounds the center region of the first input color plane. The CAC circuit is further configured to generate an output color plane that includes a center region and a scaled peripheral region that surrounds the center region of the output color plane. The center region of the output color plane is the same as the center region of the first input color plane. The scaled peripheral region is generated by scaling the peripheral region. The drive circuit is configured to update a display panel based on the output color plane.

In yet another exemplary embodiment, the present disclosure provides a method. The method includes receiving, by a display driver integrated circuit (IC), an input color plane that includes a center region and a peripheral region that surrounds the center region of the input color plane. The method further includes generating, by the display driver IC, an output color plane that includes a center region and a scaled peripheral region that surrounds the center region of the output color plane. The center region of the output color plane is the same as the center region of the input color plane. The scaled peripheral region is generated by scaling the peripheral region. The method further includes updating, by the display driver IC, a display panel based on the output color plane.

Further features and aspects are described in additional detail below with reference to the attached drawings.

Figure 1:
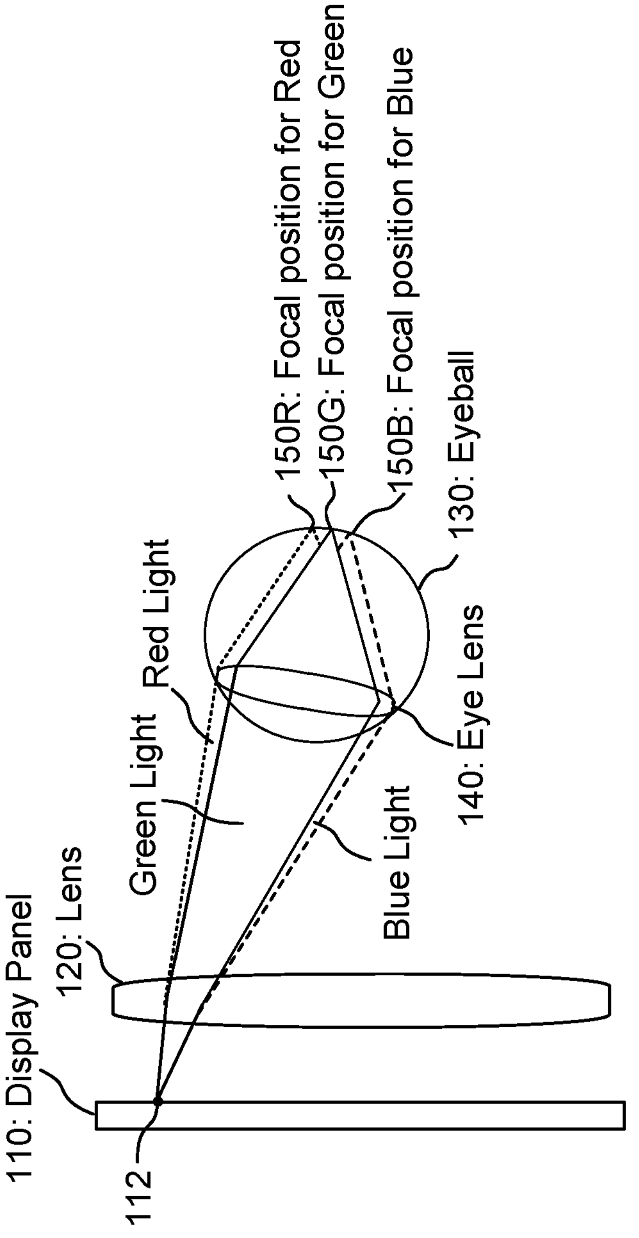
FIG. 1 shows an example of the effect of chromatic aberration of a lens disposed in front of a display panel, according to one or more examples of the present disclosure.

To facilitate understanding, identical reference numerals have been used, where possible, to designate elements that are common to the figures. It is contemplated that elements disclosed in one embodiment may be utilized in other embodiments without specific recitation. Suffixes may be attached to reference numerals for distinguishing elements from each other. The drawings referred to herein should not be understood as being drawn to scale unless specifically noted. Also, the drawings are often simplified and details or components omitted for clarity of presentation and explanation. The drawings and discussion serve to explain principles discussed below.

DETAILED DESCRIPTION

The following detailed description is exemplary in nature and is not intended to limit the disclosure or the application and uses of the disclosure. Furthermore, there is no intention to be bound by any expressed or implied theory presented in the preceding background, summary and brief description of the drawings, or the following detailed description.

In the following detailed description, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

The term "coupled" as used herein means connected directly to or connected through one or more intervening components or circuits. Further, throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As discussed above, some panel display devices, such as HMD devices, may be configured such that the user views the image on the display panel through a lens. The lens enlarges the field of view, thereby facilitating the provision of an immersive experience to the user of the panel display device.

The lens placed in front of the display panel may however cause artifacts due to chromatic aberration. The chromatic aberration of the lens may cause light beams with different wavelengths to focus at different positions, resulting in a "color shift" at the periphery of the display image. The "color shift" referred to herein refers to an artifact caused by color planes of different colors being displayed with a slight shift in relation to each other.

One method to mitigate the "color shift" is to perform digital image processing on the image to be displayed. Such digital image processing may be referred to as chromatic aberration correction (CAC). To reduce the hardware and/or power consumption required for CAC, effective and efficient CAC processing is desired. This is particularly the case when the digital image processing for CAC is implemented in a display driver integrated circuit (IC) that drives a display panel, as there are severe limitations in the design of the display driver IC in terms of hardware and/or power consumption. The present disclosure provides technologies for achieving effective and efficient CAC processing, particularly suitable for display driver ICs.

FIG. 1 shows an example of the effect of chromatic aberration of a lens 120 disposed in front of the display panel 110 when a user views an image displayed on the display panel 100 through the lens 120. The red, green, and blue light beams emitted from a pixel 112 are refracted as the light beams pass through the lens 120 and then enter the eyeball 130. The light beams that have entered the eyeball 130 are focused by the eye lens 140 onto the retina of the eyeball 130. Due to chromatic aberration in the lens 120, the red, green and blue light beams are refracted at different angles of refraction and correspondingly focused at different focal positions on the retina of the eyeball 130. In FIG. 1, the numerals 150R, 150G, and 150B denote the focal positions for the red, green, and blue light beams. The different focal positions 150R. 150G, and 150B for the red, green and blue light beams may be observed by the user as "color shift" in the periphery of the image.

Figure 2A:
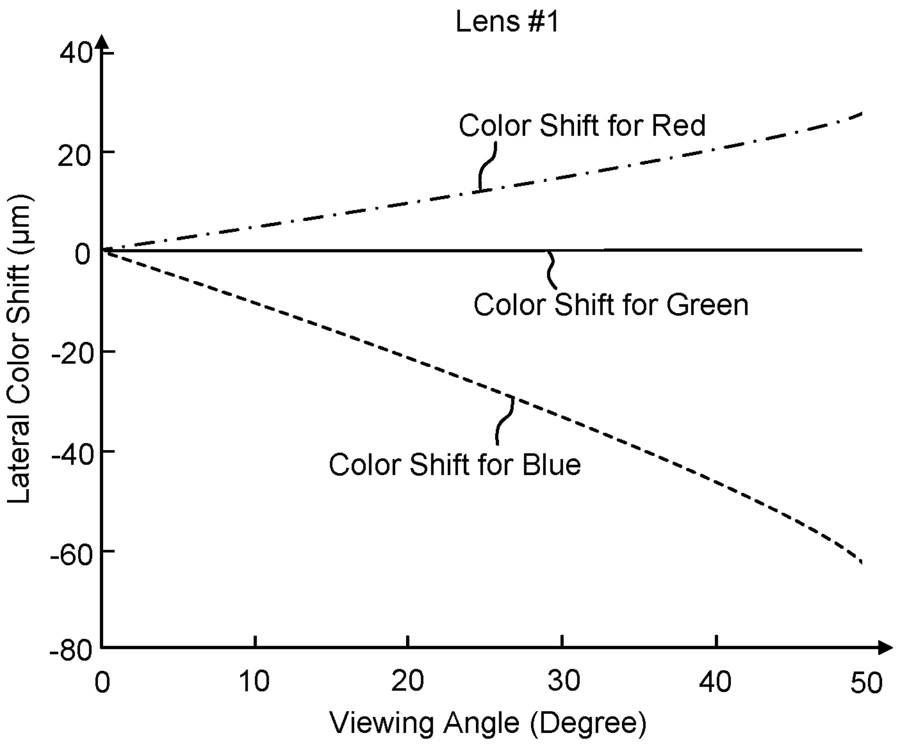
FIG. 2A shows an example of lateral color shifts caused by chromatic aberration in a pancake lens, according to one or more examples of the present disclosure.
Figure 2B:
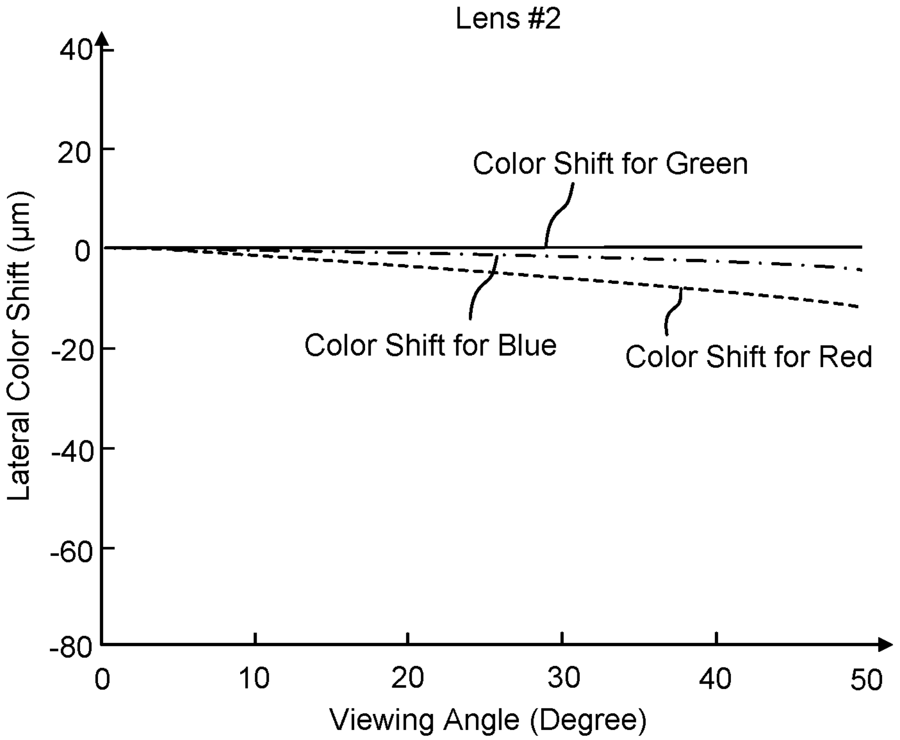
FIG. 2B shows an example of lateral color shifts caused by chromatic aberration in an improved pancake lens, according to one or more examples of the present disclosure.
Figure 2C:
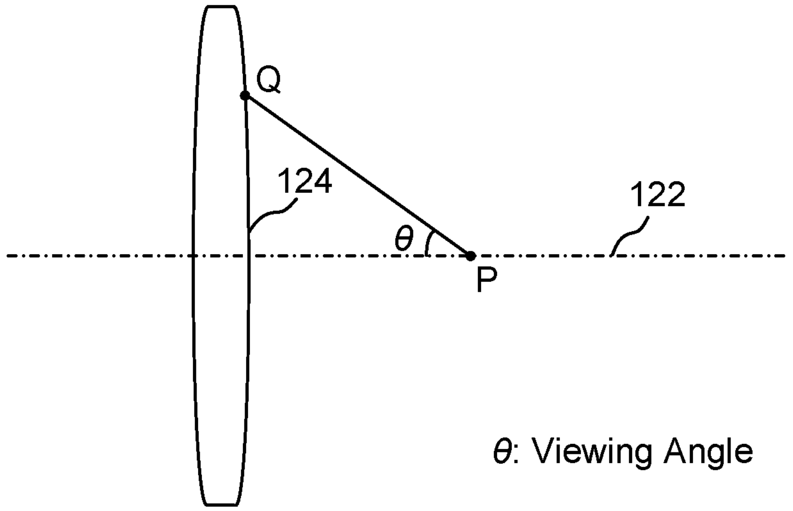
FIG. 2C shows an illustration of a viewing angle, according to one or more examples of the present disclosure.

FIG. 2A shows an example of lateral color shifts caused by chromatic aberration in lens #1, and FIG. 2B shows an example of lateral color shifts caused by chromatic aberration in lens #2. It is noted that lenses #1 and #2 are presented as mere example lenses and the discussion given herein applies to other lenses. In FIGS. 2A and 2B, the color shifts are defined with respect to green, i.e., the lateral color shifts for green are defined as zero. The lateral color shifts for red and blue vary with the viewing angle, which, as shown in FIG. 2C, is defined as the angle between the line PQ and the optical axis 122 of the lens 120, where P is the viewpoint positioned on the optical axis 122 of the lens of interest and Q is the point at which the line of sight intersects the incident surface of the lens 120. The viewing angle is indicated by "θ" in FIG. 2C.

As understood from FIGS. 2A and 2B, chromatic aberration characteristics vary from lens to lens. Referring to FIG. 2A, lens #1 exhibits significant color shifts for red (R) and blue (B). The magnitudes of the color shifts for red and blue increase as the viewing angle increases, while the direction of the color shift for red is opposite to the direction of the color shift for blue. Referring to FIG. 2B, although the improved pancake structure of lens #2 reduces color shifts compared to lens #1, the color shifts still remain at the level desired to be corrected. The color shift directions for red and blue are the same with respect to lens #2.

Figure 3:
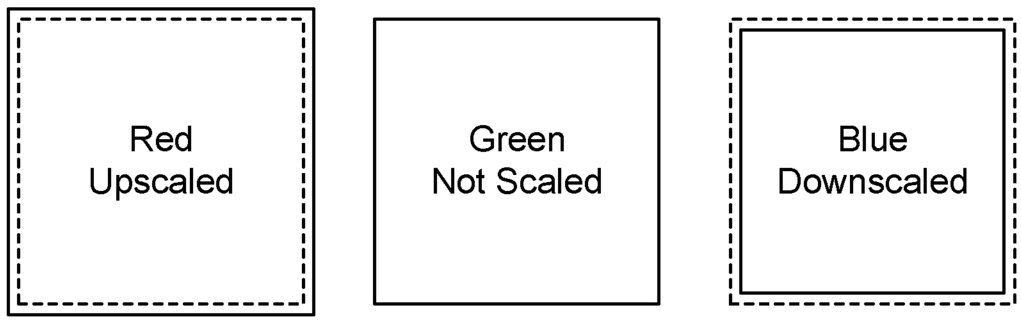
FIG. 3 shows an example of chromatic aberration correction (CAC) processing which involves scaling red and blue color planes, according to one or more examples of the present disclosure.

One measure to correct the color shifts caused by the chromatic aberration is to perform digital processing on the display image. Such digital image processing may be referred to as chromatic aberration correction (CAC) processing. The CAC processing may involve scaling (upscaling or downscaling) the red and blue color planes of the display image. FIG. 3 shows an example of the scaling of the red and blue color planes. In the shown implementation, the red color plane is upscaled or enlarged while the blue color plane is downscaled or reduced. It is noted that whether the red color plane is upscaled or downscaled and whether the blue color plane is upscaled or downscaled depend on the chromatic aberration characteristics of the lens. In other implementations, for example, the red color plane may be downscaled and the blue color plane may be upscaled. In still other implementation, both the red and blue color planes may be upscaled. In still other implementation, both the red and blue color planes may be downscaled.

Figure 4:
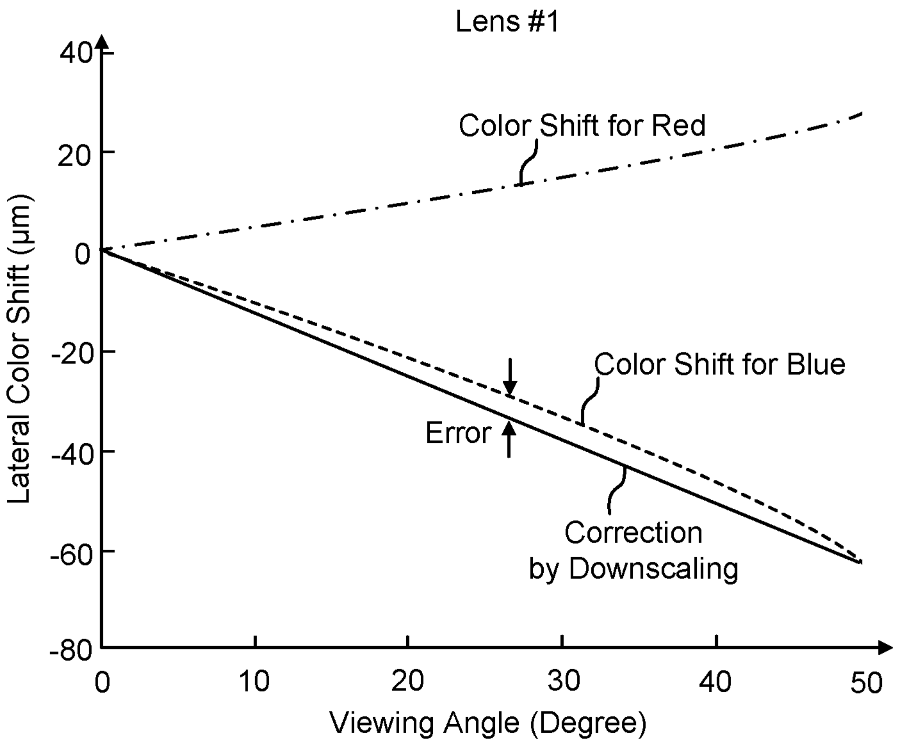
FIG. 4 shows an example of the color shift correction for blue, according to one or more examples of the present disclosure.

Simply scaling the red and blue color planes may, however, cause correction errors because the magnitudes of the color shifts may increase curvilinearly with the viewing angle in the periphery of the display image. FIG. 4 shows an example of color shift correction for blue, where the solid line indicates the correction amount achieved by simply downscaling the blue color plane of the display image, and the dashed line indicates the color shift for blue. Simply scaling the blue color plane results in correction amounts that linearly increase with the viewing angle, which does not match the curvilinear characteristics of the color shift for blue. This may also be the case with the red color plane.

Using complicated CAC processing may reduce the errors in correcting the color shifts. For example, one possible method may be to scale the red and blue color planes with scale factors that vary continuously depending on the position in the color plane. Using complicated CAC processing may however undesirably increase hardware, such as line buffers and frame buffers, and/or power consumption. The increase in hardware and/or power consumption used for CAC can be a significant problem, especially when the CAC processing is implemented in a display driver integrated circuit (IC). Accordingly, CAC processing is desired to be efficient while effectively reducing the correction error. The following describes various embodiments of the present disclosure that effectively achieve error-reduced CAC processing with efficient digital image processing.

Figure 5:
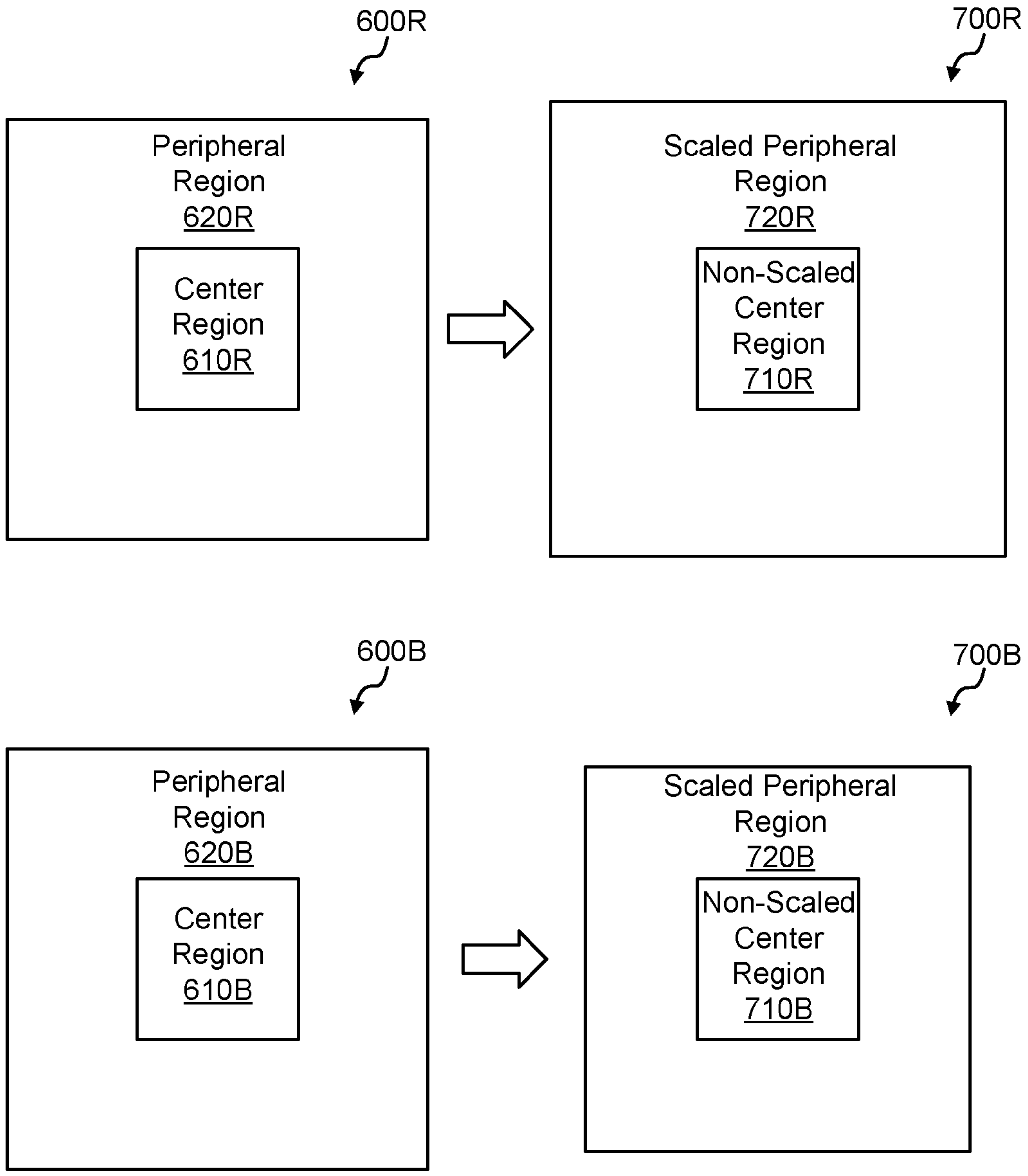
FIG. 5 shows an example of CAC processing, according to one or more embodiments.

FIG. 5 shows an example of CAC processing, according to one or more embodiments of the present disclosure. The CAC processing of the shown embodiment involves partially scaling an input red color plane 600R and an input blue color plane 600B to generate an output red color plane 700R and an output blue color plane 700B, respectively.

The details of the partial scaling of the input red color plane 600R are as follows. The input red color plane 600R includes a center region 610R and a peripheral region 620R that surrounds the center region 610R. In the shown embodiment, the center region 610R is rectangular. In other embodiments, the center region 610R may have a different shape, such as a hexagonal shape, a rhombic shape, etc. The center region 610R of the input red color plane 600R is used as the center region 710R of the output red color plane 700R without being scaled. Meanwhile, the scaled peripheral region 720R of the output red color plane 700R, which surrounds the center region 710R, is generated by scaling the peripheral region 620R. While FIG. 5 shows that the peripheral region 620R is upscaled (or enlarged) to generate the scaled peripheral region 720R, the peripheral region 620R may be downscaled (or reduced). Further, the sizes of the center region 610R, the peripheral region 620R, the center region 710R, and the scaled peripheral region 720R may be adjusted according to the chromatic aberration characteristics of the lens.

A similar partial scaling is applied to the input blue color plane 600B. The input blue color plane 600B includes a center region 610B and a peripheral region 620B that surrounds the center region 610B. In the shown embodiment, the center region 610B is rectangle. The center region 610B of the input blue color plane 600B is used as the center region 710B of the output blue color plane 700B without being scaled. Meanwhile, the scaled peripheral region 720B of the output blue color plane 700B, which surrounds the center region 710B, is generated by scaling the peripheral region 620B. While FIG. 5 shows that the peripheral region 620B is downscaled (or shrunk) to generate the scaled peripheral region 720B, the peripheral region 620B may be upscaled (or enlarged). Further, the sizes of the center region 610B, the peripheral region 620B, the center region 710B, and the scaled peripheral region 720B may be adjusted in accordance with the chromatic aberration characteristics of the lens.

Figure 6A:
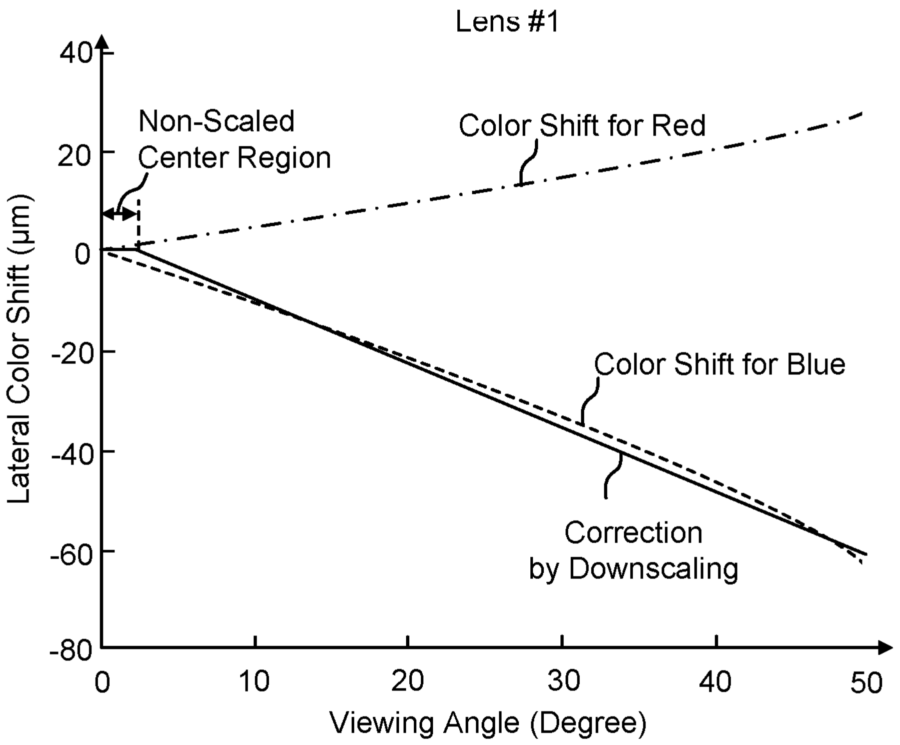
FIGS. 6A and 6B show example correction errors for blue, according to one or more embodiments.
Figure 6B:
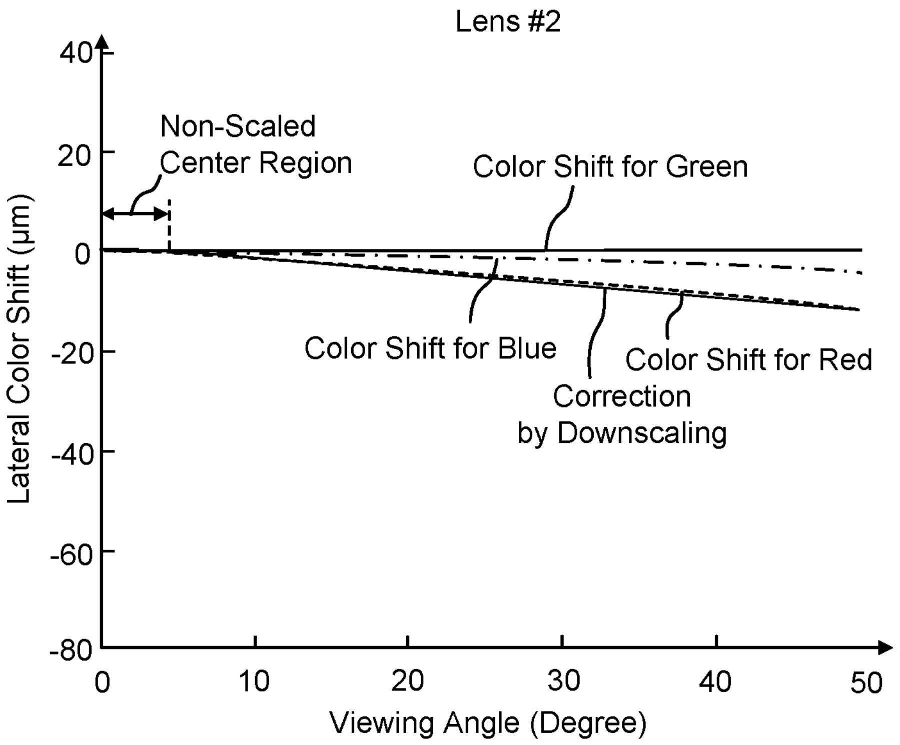

The CAC processing shown in FIG. 5 is relatively efficient, and it effectively reduces the correction errors compared to scaling the entire input red color plane and the entire input blue color plane as shown in FIG. 3. FIG. 6A shows example correction errors for blue for lens #1, according to one or more embodiments of the present disclosure, where the solid line indicates the correction amount achieved by partially downscaling the blue color plane, and the dashed line indicates the color shift for blue. Due to the existence of the non-scaled center region, the correction amount is zero in a viewing angle range between 0 and a certain viewing angle and increases with the viewing angle in the range above the certain viewing angle. Such a change in the correction amount with the viewing angle effectively reduces the correction error. The same applies to the lens #2 as shown in FIG. 6B.

In other embodiments, the CAC processing may further involve partially scaling an input green color plane to generate an output green color plane. In such embodiments, similar partial scaling may be applied to the input green color plane. The input green color plane may include a center region and a peripheral region that surrounds the center region. The center region may be rectangle. The center region of the input green color plane may be used as the center region of the output green color plane without being scaled. Meanwhile, the scaled peripheral region of the output green color plane, which surrounds the center region, may be generated by scaling (upscaling or downscaling) the peripheral region. In still other embodiments, the CAC processing may involve partially scaling the input red and green color planes to generate the output red and green color planes without scaling the input blue color plane. In still other embodiments, the CAC processing may involve partially scaling the input green and blue color planes to generate the output green and blue color planes without scaling the input red color plane.

Figure 7:
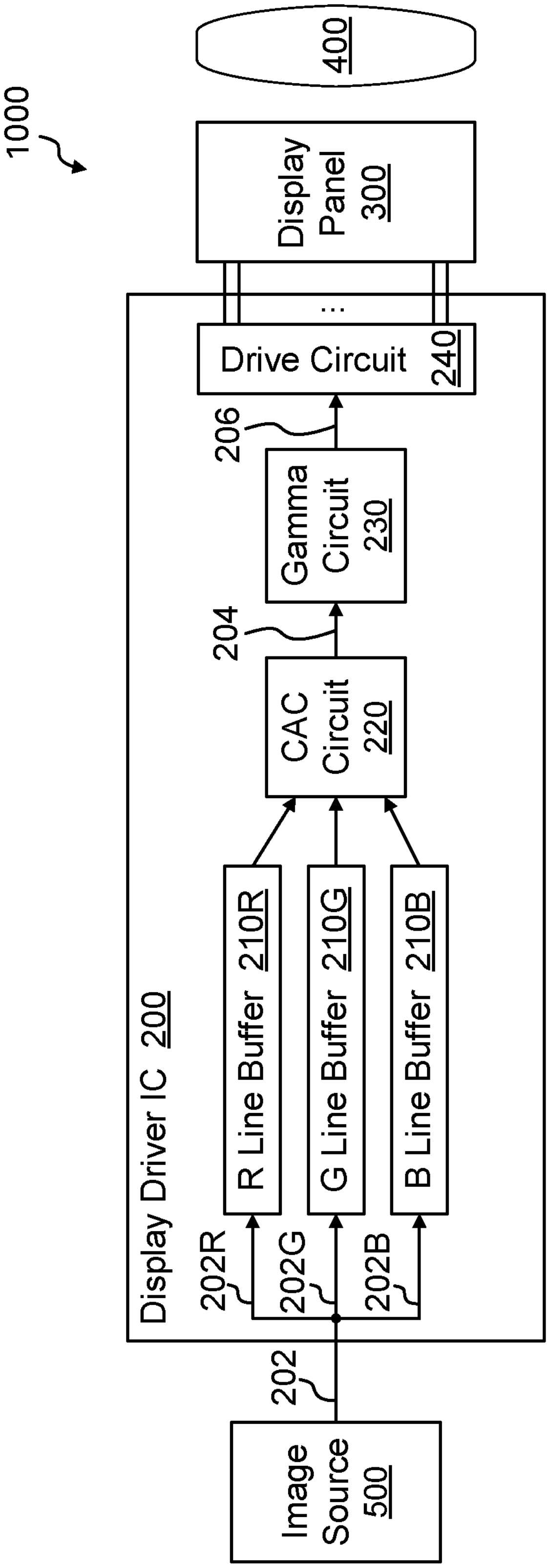
FIG. 7 shows an example configuration of a display device adapted for CAC processing, according to one or more embodiments.

FIG. 7 shows an example configuration of a display device 1000 adapted to the CAC processing shown in FIG. 5, according to one or more embodiments. In the shown embodiment, the display device 1000 includes a display driver IC 200, a display panel 300, and a lens 400. The display driver IC 200 is configured to receive an input image 202 from an image source 500 and drive the display panel 300 based on the input image 202. Examples of the image source 500 include an application processor, a central processing unit (CPU), a microcontroller, and other types of processors and controllers. In the shown embodiment, the input image 202 includes an input red color plane 202R, an input green color plane 202G, and an input blue color plane 202B. The input red color plane 202R includes red (R) greylevels of respective pixels of the input image 202. Correspondingly, the input green color plane 202G includes green (G) greylevels of the respective pixels of the input image 202, and the input blue color plane 202B includes blue (B) greylevels of the respective pixels of the input image 202. The lens 400 is disposed in front of the display panel 300 so that the user views the image displayed on the display panel 300 through the lens 400.

In the shown embodiment, the display driver IC 200 includes an R line buffer 210R, a G line buffer 210G, a B line buffer 210B, a CAC circuit 220, a gamma circuit 230, and a drive circuit 240. The R line buffer 210R is configured to receive and store therein the input red color plane 202R. Correspondingly, the G line buffer 210G is configured to receive and store therein the input green color plane 202G, and the B line buffer 210B is configured to receive and store therein the input blue color plane 202B. The CAC circuit 220 is configured to apply CAC processing to the input red color plane 202R, the input green color plane 202G, and the input blue color plane 202B to generate an output image 204. As discussed in relation to FIG. 5, the CAC processing involves partial scaling of the input red color plane 202R and the input blue color plane 202B. The output image 204 is generated in a form of image data that specifies greylevels of respective display elements of the display panel 300. The gamma circuit 230 is configured to apply a gamma transformation to the image data of the output image 204 to generate gamma-transformed image data 206. The drive circuit 240 is configured to drive or update the display panel 300 based on the gamma-transformed image data 206. In one implementation, the gamma-transformed image data 206 may specify the greylevels of display elements of the display panel 300, and the drive circuit 240 may be configured to generate data voltages with which the display elements of the display panel 300 are updated or driven. It is noted that the display driver IC 200 may be configured to perform image processing other than the CAC and the gamma transformation on the input image 202 and/or the output image 204.

Figure 8:
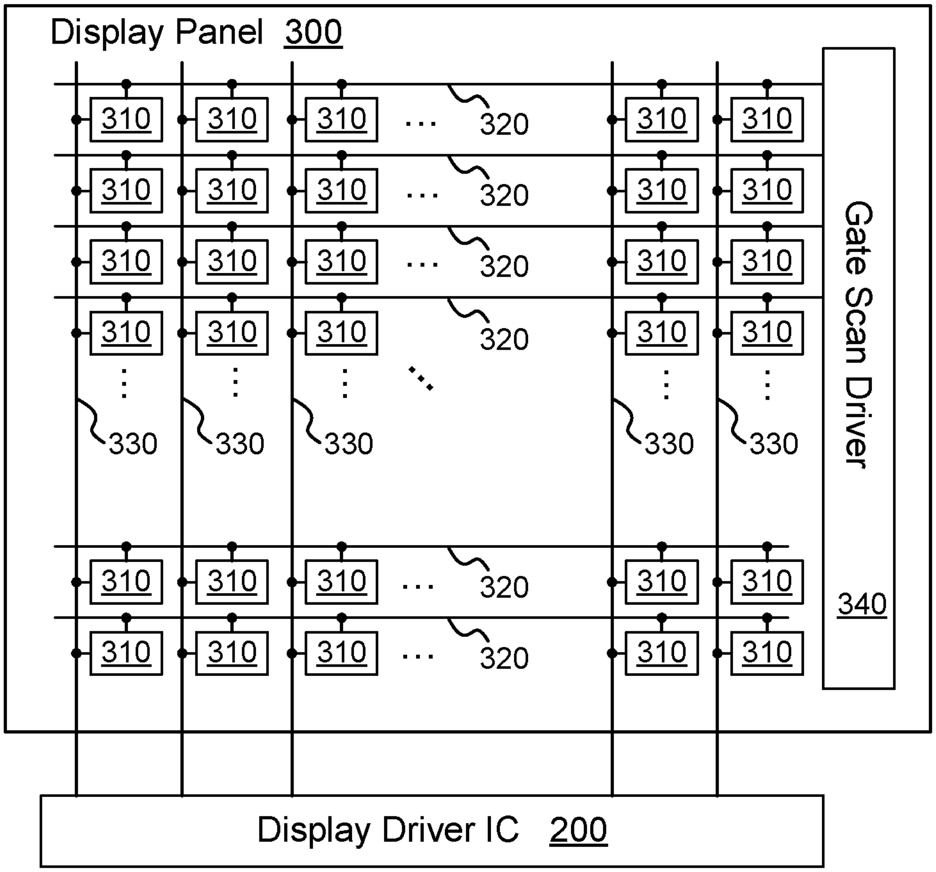
FIG. 8 shows an example configuration of a display panel, according to one or more embodiments.

FIG. 8 shows an example configuration of the display panel 300, according to one or more embodiments. In the shown embodiment, the display panel 300 includes an array of display elements 310, gate lines (also referred to as scan lines) 320, source lines (also referred to as data lines) 330, and a gate scan driver 340. The display elements 310 are each coupled to a corresponding one of the gate lines 320 and a corresponding one of the source lines 330 such that a row of the display elements 310 arranged in the horizontal direction are coupled to the same gate line 320. The display elements 310 may each be configured to receive a data voltage from the display driver IC 200 via the corresponding source line 330 and to display red, green, or blue color at the luminance level corresponding to the data voltage. The gate lines 320 are arranged to extend in the horizontal direction, while the source lines 330 are arranged to extend in the vertical direction. The gate scan driver 340 is configured to scan the gate lines 320 to select the display elements 310 to be updated or driven.

Figure 9:
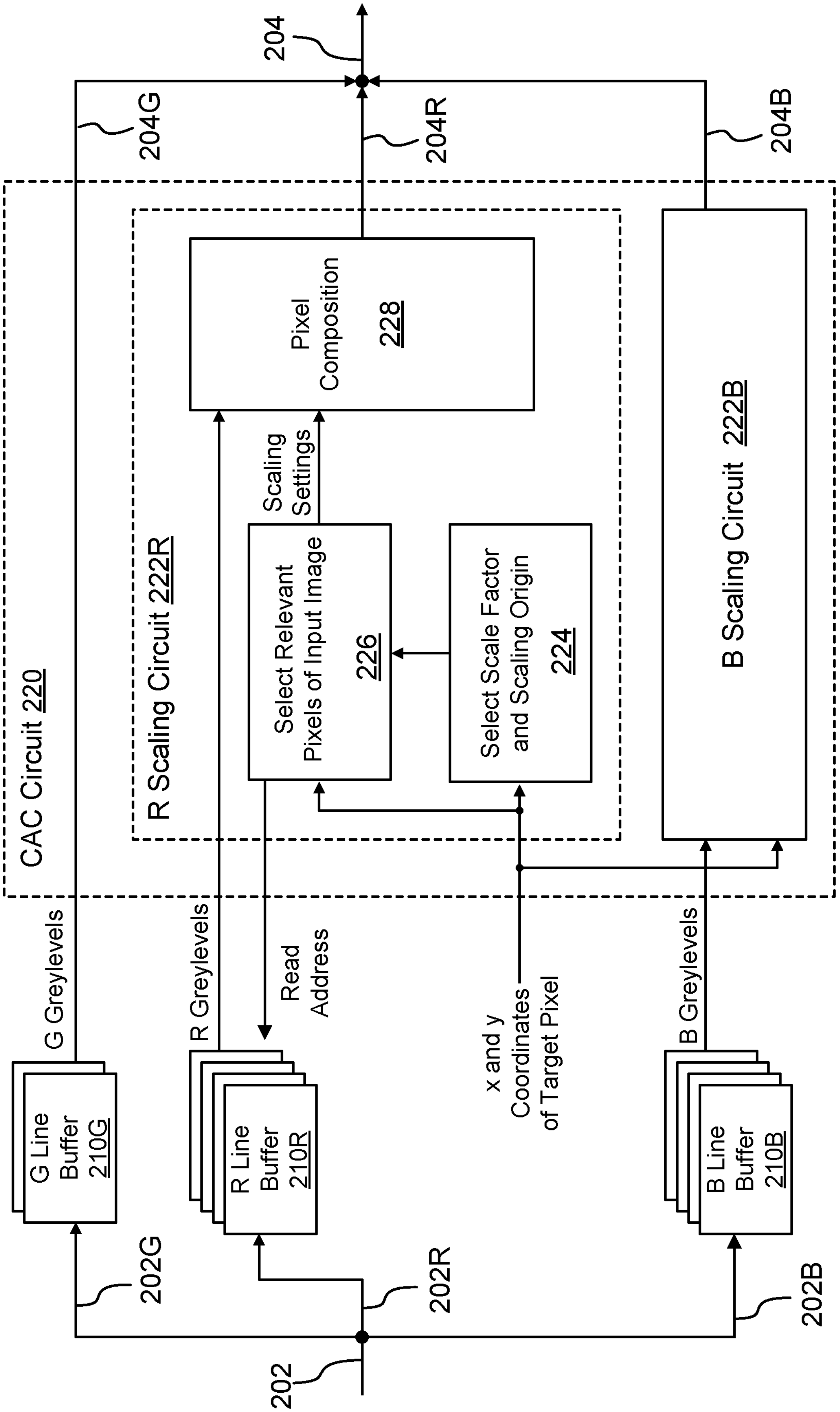
FIG. 9 shows an example configuration of a CAC circuit, according to one or more embodiments.

FIG. 9 shows an example configuration of the CAC circuit 220, according to one or more embodiments. In the shown embodiment, the CAC circuit 220 includes an R scaling circuit 222R and a B scaling circuit 222B. The R scaling circuit 222R is configured to receive the input red color plane 202R from the R line buffer 210R and perform "partial scaling" on the input red color plane 202R to generate an output red color plane 204R as described in relation to FIG. 5. The B scaling circuit 222B is configured to receive the input blue color plane 202B stored in the B line buffer 210B and perform "partial scaling" on the input blue color plane 202B to generate an output blue color plane 204B. The input green color plane 202G is used as an output green color plane 204G without being scaled. The output image 204, which is provided to the gamma circuit 230, includes the output red color plane 204R, the output green color plane 204G, and the output blue color plane 204B. As described in relation to FIG. 7, a gamma transformation is applied to the output image 204 to generate the gamma-transformed image data 206, which is used to update the display elements 310 of the display panel 300.

In the shown embodiment, the R scaling circuit 222R includes arithmetic processing blocks 224, 226, and 228. The arithmetic processing block 224 is configured to receive the x and y coordinates of the target pixel in the output image 204 and select the scale factor and the scaling origin used for determining the red greylevel of the target pixel during the "partial scaling." The "target pixel" is the pixel in the output image 204 for which arithmetic processing for the partial scaling is currently performed. The x coordinate of the target pixel indicates the position of the target pixel in the horizontal direction in the output image 204 and the y coordinate of the target pixel indicates the position of the target pixel in the vertical direction in the output image 204. The selection of the scale factor will be described later with reference to FIGS. 10 and 11, and the selection of the scaling origin will be described later with reference to FIG. 12.

The arithmetic processing block 226 is configured to select relevant pixels of the input red color plane 202R based on the x and y coordinates of the target pixel and provide the read address to the R line buffer 210R to retrieve R greylevels of the relevant pixels. The arithmetic processing block 226 is further configured to determine weights assigned to the respective relevant pixels of the input red color plane 202R based on the scale factor and the scaling origin.

The arithmetic processing block 228 is configured to perform pixel composition which involves determining the red greylevel of the target pixel based on the R greylevels of the relevant pixels and the weights assigned to the relevant pixels. In one implementation, the red greylevel of the target pixel may be the weighted average of the R greylevels of the relevant pixels calculated using the weights assigned to the relevant pixels. The output red color plane 204R includes the thus calculated red greylevel of the target pixel.

Although not explicitly shown, the B scaling circuit 222B is configured similarly to the R scaling circuit 222R and operates similarly to the R scaling circuit 222R to generate the output blue color plane 204B.

Figure 10:
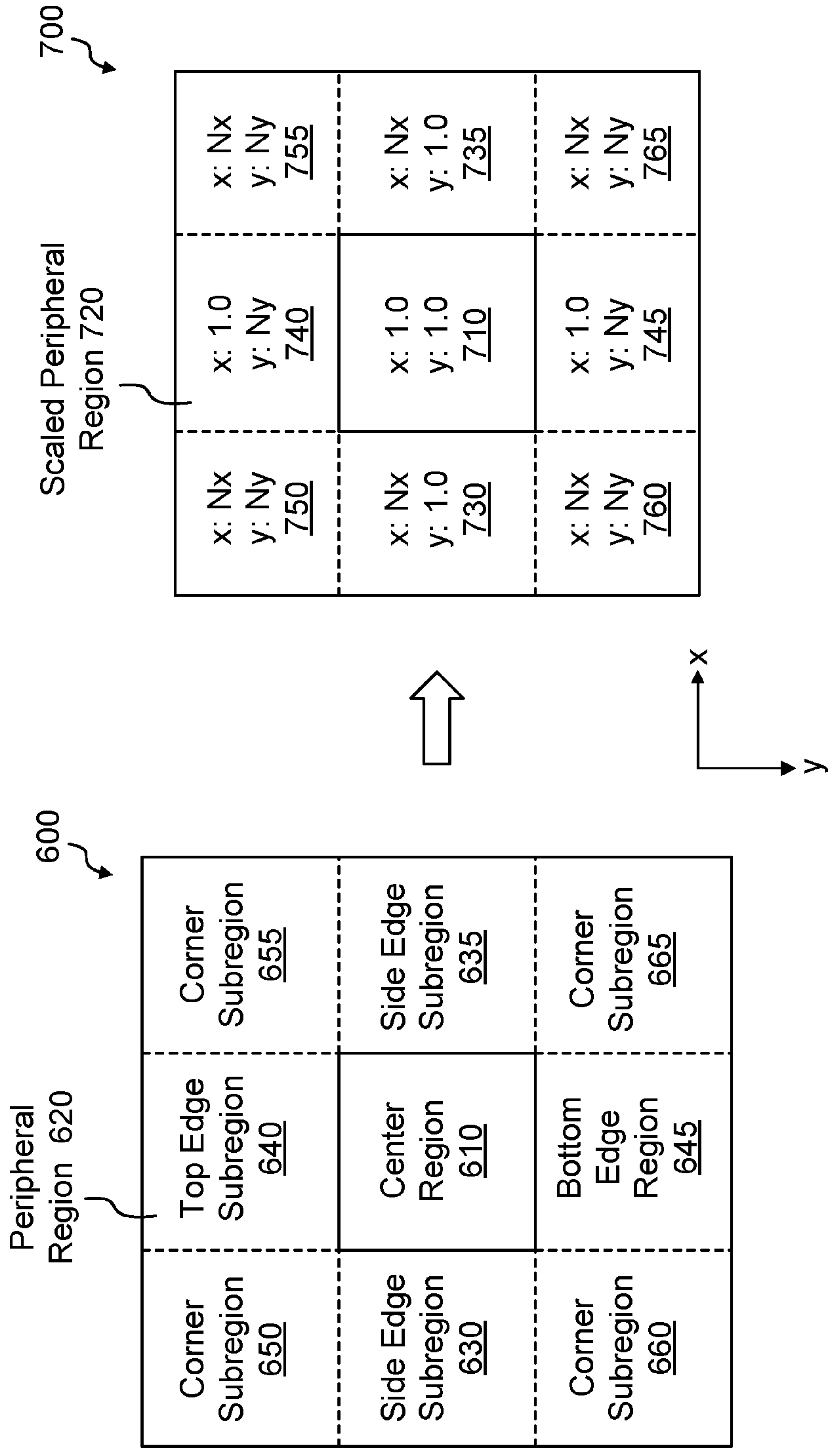
FIG. 10 shows an example of "partial scaling" applied to an input red color plane and an input blue color plane, according to one or more embodiments.

FIG. 10 shows an example of the "partial scaling" applied to the input red color plane 202R and the input blue color plane 202B, according to one or more embodiments. Because similar "partial scaling" is applied to the input red color plane 202R and the input blue color plane 202B, the input red color plane 202R and the input blue color plane 202B are collectively referred to as the input color plane 600, and a description of the "partial scaling" applied to the input color plane 600 is given below. The input color plane 600 is subjected to "partial scaling" to generate an output color plane 700, which may correspond to either the output red color plane 204R or the output blue color plane 204B shown in FIG. 9. In FIG. 10, an orthogonal xy coordinate system is shown to indicate directions and positions in the input and output color planes 600 and 700. The x-axis is defined parallel to the horizontal direction of the input and output color planes 600 and 700, and the y-axis is defined parallel to the vertical direction of the input and output color planes 600 and 700. It is noted that the horizontal direction of the input and output color planes 600 and 700 corresponds to the horizontal direction of the display panel 300, and the vertical direction of the input and output color planes 600 and 700 corresponds to the vertical direction of the display panel 300.

As described above in relation to FIG. 5, the input color plane 600 includes a center region 610 and a peripheral region 620 that surrounds the center region 610, while the output color plane 700 includes a center region 710 and a scaled peripheral region 720 that surrounds the center region 710. The center region 610 of the input color plane 600 is used as the center region 710 of the output color plane 700 without being scaled; the center region 710 of the output color plane 700 is the same as the center region 610 of the input color plane 600. Meanwhile, the scaled peripheral region 720 of the output color plane 700 is generated by scaling the peripheral region 620 of the input color plane 600. While the illustration of FIG. 10 shows the case where the peripheral region 620 of the input color plane 600 is downscaled to generate the scaled peripheral region 720, the peripheral region 620 may instead be upscaled.

In the shown embodiment, the peripheral region 620 of the input color plane 600 is segmented into side edge subregions 630, 635, a top edge subregion 640, a bottom edge subregion 645, and corner subregions 650, 655, 660, and 665. The side edge subregions 630 and 635 are horizontally aligned with the center region 610 to the left and right of the center region 610, respectively. The side edge subregions 630 and 635 have the same vertical height as the center region 610. The top edge subregion 640 is vertically aligned with the center region 610 on the top side of the center region 610, and the bottom edge subregion 645 is vertically aligned with the center region 610 on the bottom side of the center region 610. The top and bottom edge subregions 640 and 645 has the same horizontal width as the center region 610. The corner subregions 650, 655, 660, and 665 are positioned adjacent to the respective corners of the center region 610. The corner subregions 650 and 655 are horizontally aligned with the top edge subregion 640, and the corner subregions 660 and 665 are horizontally aligned with the bottom edge subregion 645. Further, the corner subregions 650, 655, 660, and 665 have the same vertical height as the top and bottom edge subregions 640 and 645 and the same horizontal width as the side edge subregions 630 and 635.

The scaled peripheral region 720 of the output color plane 700 is segmented into scaled side edge subregions 730, 735, a scaled top edge subregion 740, a scaled bottom edge subregion 745, and scaled corner subregions 750, 755, 760, and 765.

The scaled side edge subregions 730 and 735 are generated by scaling the side edge subregions 630 and 635, respectively, of the input color plane 600 in the horizontal direction by a scale factor of Nx without scaling the same in the vertical direction (i.e., the scale factor for the vertical direction is 1.0). In embodiments where the scaled side edge subregions 730 and 735 are generated by downscaling the side edge subregions 630 and 635, respectively, the scale factor Nx is less than 1.0. In embodiments where the scaled side edge subregions 730 and 735 are generated by upscaling the side edge subregions 630 and 635, respectively, the scale factor Nx is greater than 1.0. The scaled side edge subregions 730 and 735 are horizontally aligned with the center region 710 to the left and right of the center region 710, respectively. The scaled side edge subregions 730 and 735 have the same vertical height as the center region 710.

The scaled top and bottom edge subregions 740 and 745 are generated by scaling the top and bottom edge subregions 640 and 645, respectively, of the input color plane 600 in the vertical direction by a scale factor of Ny without scaling the same in the horizontal direction (i.e., the scale factor for the horizontal direction is 1.0). In embodiments where the scaled top and bottom edge subregions 740 and 745 are generated by downscaling the top and bottom edge subregions 640 and 645, respectively, the scale factor Ny is less than 1.0. In embodiments where the scaled top and bottom edge subregions 740 and 745 are generated by upscaling the top and bottom edge subregions 640 and 645, respectively, the scale factor Ny is greater than 1.0. In one implementation, the scale factor Nx is equal to the scale factor Ny. In other implementations, the scale factor Nx may be different from the scale factor Ny. The scaled top and bottom edge subregions 740 and 745 are vertically aligned with the center region 710 on the top and bottom sides of the center region 710, respectively.

The scaled corner subregion 750, 755, 760, and 765 are generated by scaling the corner subregions 650, 655, 660, and 665 of the input color plane 600 by the scale factor of Nx in the horizontal direction and by the scale factor of Ny in the vertical direction, respectively. The scaled corner subregions 750, 755, 760, and 765 are positioned adjacent to the respective corners of the center region 710. The scaled corner subregions 750 and 755 are horizontally aligned with the scaled top edge subregion 740, and the scaled corner subregions 760 and 765 are horizontally aligned with the scaled bottom edge subregion 745. Further, the scaled corner subregions 750, 755, 760, and 765 have the same vertical height as the scaled top and bottom edge subregions 740 and 745 and the same horizontal width as the scaled side edge subregions 730 and 735.

Figure 11:
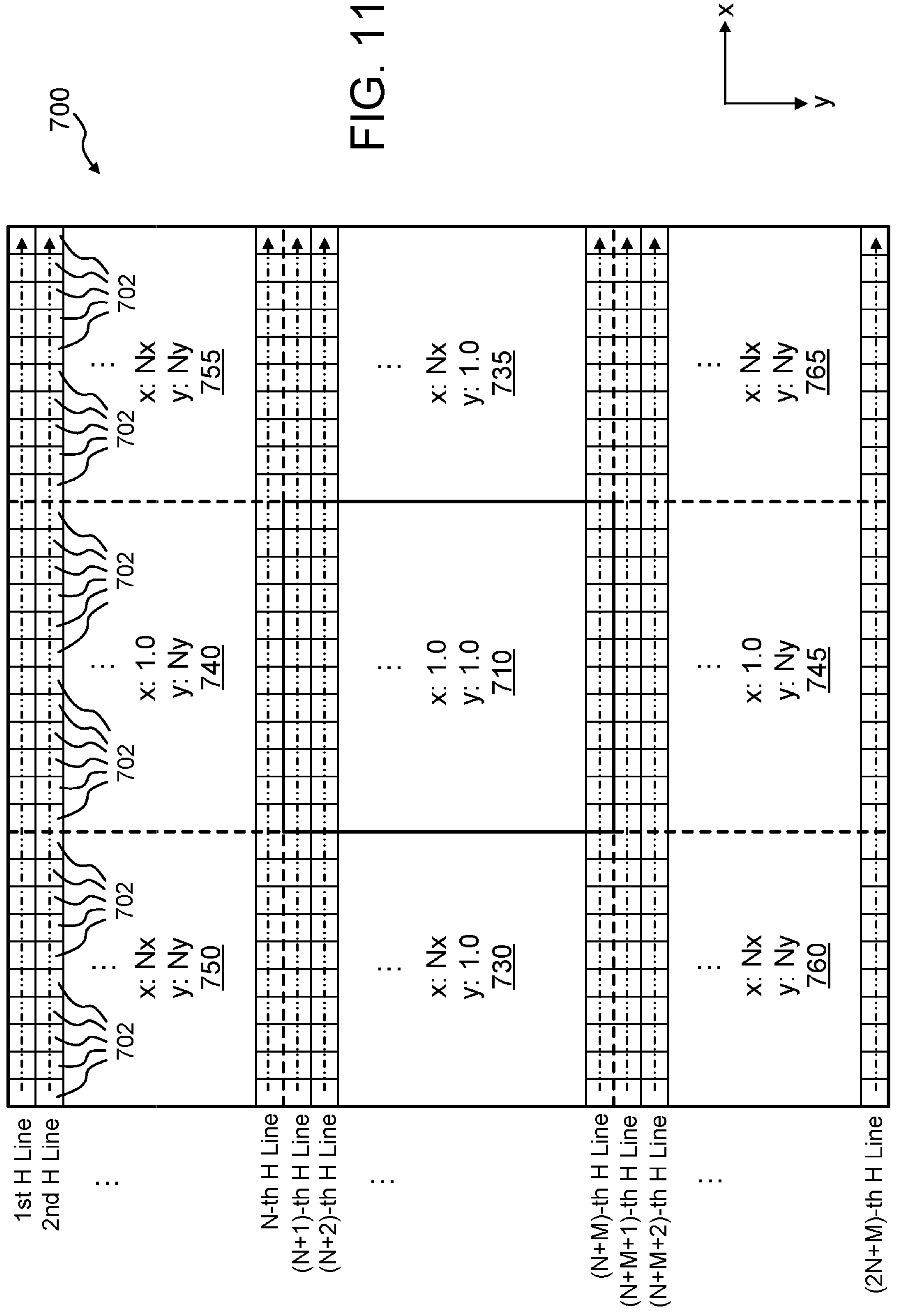
FIG. 11 shows an example of "horizontal lines" of an output color plane, according to one or more embodiments.

As shown in FIG. 11, the output color plane 700 includes "horizontal lines", referred to as "H-Line" in FIG. 11. As used herein, a horizontal line is a row of pixels 702 of the output color plane 700 arrayed in the horizontal direction. In the embodiment shown in FIG. 11, the output color plane 700 includes first to (2N+M)-th horizontal lines arranged in the vertical direction in that order. Each of the first to (2N+M)-th horizontal lines includes a row of pixels 702 arranged in the horizontal direction. The first to N-th horizontal lines cover the scaled top edge subregion 740 and the scaled corner subregions 750 and 755 of the output color plane 700. The (N+1)-th to (N+M)-th horizontal lines cover the center region 710 and the scaled side edge subregions 730 and 735. The (N+M+1)-th to (2N+M)-th horizontal lines cover the scaled bottom edge subregion 745 and the scaled corner subregions 760 and 765. Each horizontal line corresponds to a row of the display elements 310 of the display panel 300, which are arranged in the horizontal direction and coupled to the same gate line 320. The greylevels of the pixels 702 of a "horizontal line" specify the luminance levels of the corresponding row of the display elements 310 of the display panel 300.

During the partial scaling to generate the output color plane 700 (which collectively refers to the input red color plane 202R stored in the R line buffer 210R and the input blue color plane 202B stored in the B line buffer 210B), the greylevels of the pixels 702 of the output color plane 700 may be calculated horizontal line by horizontal line. In one implementation, the greylevels of the pixels 702 of the respective horizontal lines may be calculated in the order from top to bottom of the output color plane 700. More specifically, the partial scaling may first calculate the greylevels of the pixels 702 of the first horizontal line, which is positioned at the top of the output color plane 700, then calculate the greylevels of the pixels 702 of the second horizontal line, which is positioned second from the top of the output color plane 700, and then calculate the greylevels of the pixels 702 of the third horizontal line, which is positioned third from the top of the output color plane 700. A similar process may go for the fourth to (2N+M)-th horizontal lines. Calculating the greylevels of the pixels 702 in this order advantageously simplifies the accesses to the R line buffer 210R and the B line buffer 210B in the display driver IC 200, thereby facilitating the design of the display driver IC 200.

Segmenting the input color plane 600 and the output color plane 700 as shown in FIG. 10 may advantageously simplify the setting of the scale factors in calculating the greylevels of the output color plane 700 during the partial scaling. More specifically, as is understood from FIG. 11, the scale factor used for the scaling in the vertical direction to determine or calculate the greylevels of the pixels 702 of each horizontal line of the output color plane 700 is constant. This eliminates the need to change the scaling factor for the scaling in the vertical direction during the calculation of the greylevels of the pixels 702 of each horizontal line. In the example shown in FIG. 11, for example, the scale factor used for the scaling in the vertical direction with respect to the first to N-th horizontal lines is "Ny", the scale factor used for the scaling in the vertical direction with respect to the (N+1)-th to (N+M)-th horizontal lines is "1.0", and the scale factor used for the scaling in the vertical direction with respect to the (N+M+1)-th to (N+2M)-th horizontal lines is "Ny". The simplified setting of the scale factors may effectively simplify the operation of the CAC circuit 220 (including the R scaling circuit 222R and the B scaling circuit 222B), which may facilitate reduction in the circuit size of the CAC circuit 220.

Figure 12:
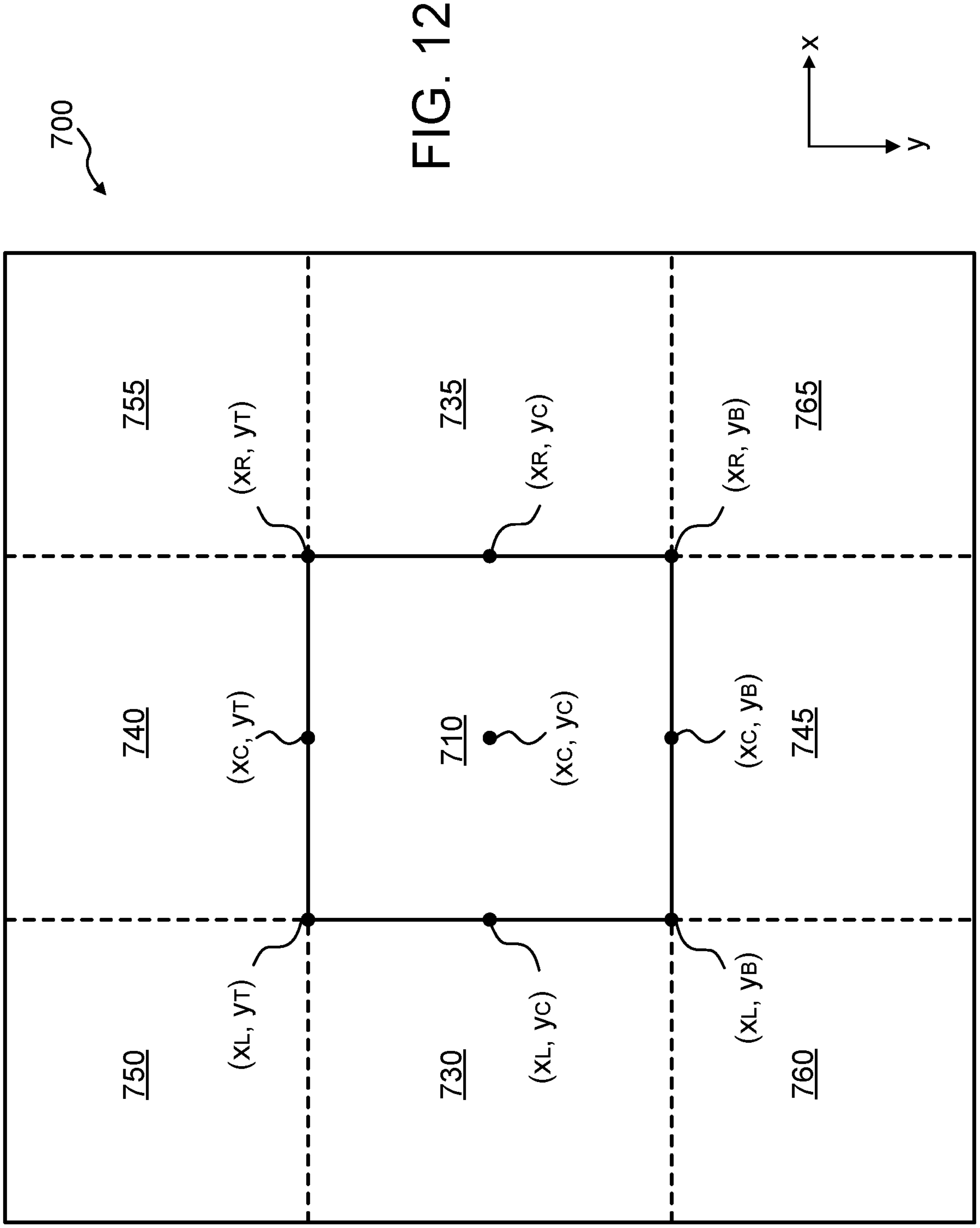
FIG. 12 shows an example of scaling origins used in the partial scaling shown in FIG. 10, according to one or more embodiments.

FIG. 12 shows an example of the scaling origins used in the partial scaling to generate the scaled side edge subregions 730, 735, the scaled top edge subregion 740, the scaled bottom edge subregion 745, and the scaled corner subregions 750, 755, 760, and 765, according to one or more embodiments. In FIG. 12. ($x_C$, $y_C$) are the x and y coordinates of the center (e.g., the geometric center) of the center region 710 of the output color plane 700, ($x_L$, $y_T$) are the x and y coordinates of the top left corner of the center region 710, and ($x_R$, $y_B$) are the x and y coordinates of the bottom right corner of the center region 710.

In the embodiment shown in FIG. 12, the scaling origin used in the scaling to generate the scaled side edge subregion 730 is positioned at the midpoint ($x_L$, $y_C$) of the left side edge of the center region 710, and the scaling origin used in the scaling to generate the scaled side edge subregion 735 is positioned at the midpoint ($x_R$, $y_C$) of the right side edge of the center region 710. The scaling origin used in the scaling to generate the scaled top edge subregion 740 is positioned at the midpoint ($x_C$, $y_T$) of the top edge of the center region 710, and the scaling origin used in the scaling to generate the scaled bottom edge subregion 745 is positioned at the midpoint ($x_C$, $y_B$) of the bottom edge of the center region 710.

The scaling origin used in the scaling to generate the corner subregion 750 (which is positioned at the left top corner of the output color plane 700) is positioned at the left top corner ($x_L$, $y_T$) of the center region 710, and the scaling origin used in the scaling to generate the corner subregion 755 (which is positioned at the right top corner of the output color plane 700) is positioned at the right top corner ($x_R$, $y_T$) of the center region 710. The scaling origin used in the scaling to generate the scaled corner subregion 760 (which is positioned at the left bottom corner of the output color plane 700) is positioned at the left bottom corner ($x_L$, $y_B$) of the center region 710, and the scaling origin used in the scaling to generate the scaled bottom subregion 765 (which is positioned at the right bottom corner of the output color plane 700) is positioned at the right bottom corner ($x_R$, $y_B$) of the center region 710. In one implementation, the arithmetic processing block 224 shown in FIG. 9 selects the scaling origin for the target pixel in accordance with the illustration shown in FIG. 12.

Figure 13:
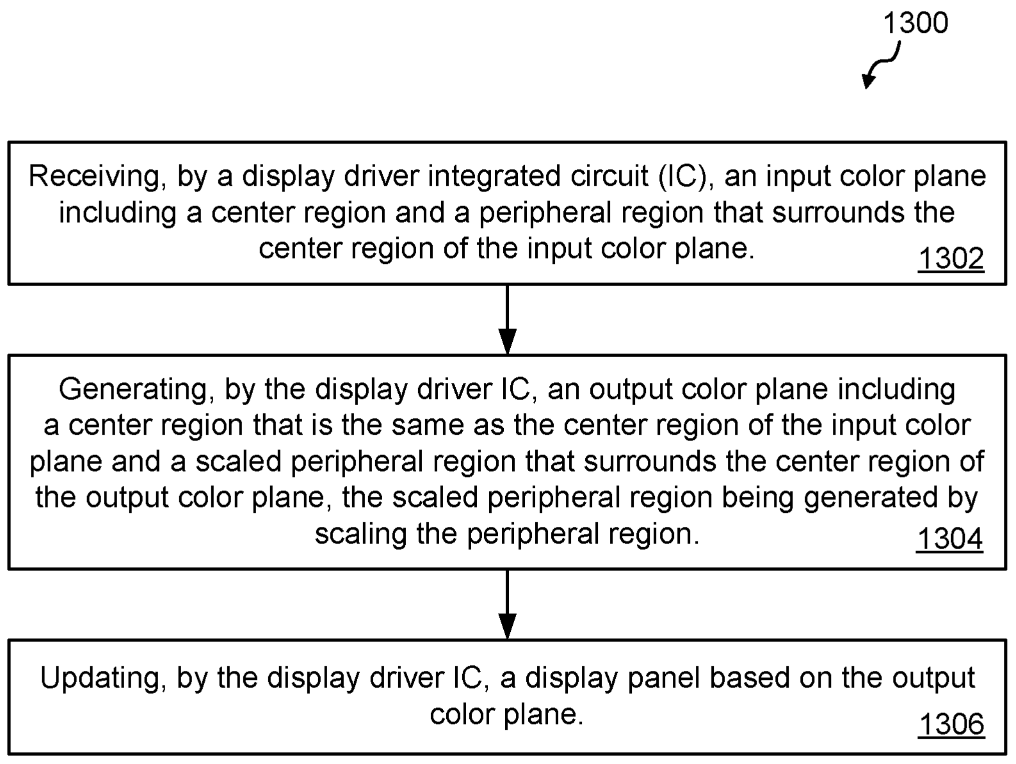
FIG. 13 is a flowchart of an exemplary process for driving or updating a display panel, according to one or more embodiments.

FIG. 13 is a flowchart of an exemplary process for driving or updating a display panel, according to one or more embodiments. The process 1300 may be performed by the display device 1000 and in particular, the display driver IC 200 shown in FIG. 7. However, it will be recognized that a display device that includes additional and/or fewer components as shown in FIG. 7 may be used to perform the process 1300, that any of the following steps may be performed in any suitable order, and that the process 1300 may be performed in any suitable environment.

The process 1300 includes receiving, by a display driver integrated circuit (IC), an input color plane (e.g., the input red and blue color planes 600R and 600B shown in FIG. 5 and the input color plane 600 shown in FIG. 10) at step 1302. The input color plane includes a center region (e.g., the center regions 610R, 610B, and 610 shown in FIGS. 5 and 10) and a peripheral region (e.g., the peripheral regions 620R, 620B, and 620 shown in FIGS. 5 and 10). The peripheral region surrounds the center region of the input color plane.

The process 1300 further includes generating, by the display driver IC, an output color plane (e.g., the output red and blue color planes 700R and 700B shown in FIG. 5 and the output color plane 700 shown in FIG. 10) at step 1304. The output color plane includes a center region (e.g., the center regions 710R, 710B, and 710 shown in FIGS. 5 and 10) and a scaled peripheral region (e.g., the peripheral regions 720R, 720B, and 720 shown in FIGS. 5 and 10) that surrounds the center region of the output color plane. The center region of the output color plane is the same as the center region of the input color plane while the scaled peripheral region is generated by scaling the peripheral region.

The process 1300 further includes updating, by the display driver IC, a display panel (e.g., the display panel 300 shown in FIG. 7) based on the output color plane at step 1306.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A display driver integrated circuit (IC), comprising:

a chromatic aberration correction (CAC) circuit configured to:

receive a first input color plane corresponding to a single color, wherein the single color is a first color, and the first input color plane comprises:

a center region; and a peripheral region that surrounds the center region of the first input color plane; and generate an output color plane comprising:

a center region that is the same as the center region of the first input color plane; and a scaled peripheral region that surrounds the center region of the output color plane, the scaled peripheral region being generated by scaling values of the first color for respective pixels in the peripheral region; and a drive circuit configured to update a display panel based on the output color plane.

2. The display driver IC of claim 1, wherein scaling the peripheral region is based on chromatic aberration of a lens disposed in front of the display panel.

3. The display driver IC of claim 1, wherein the center regions of the first input color plane and the output color plane are rectangular.

4. The display driver IC of claim 3, wherein the peripheral region of the first input color plane comprises a plurality of rectangular peripheral subregions, wherein the scaled peripheral region of the output color plane comprises a plurality of scaled rectangular peripheral subregions, and wherein each of the plurality of scaled rectangular peripheral subregions is generated by scaling a corresponding one of the plurality of rectangular peripheral subregions in one or both of a horizontal direction and a vertical direction.

5. The display driver IC of claim 3, wherein the peripheral region of the first input color plane comprises a rectangular side edge subregion horizontally aligned with the center region of the first input color plane and having the same vertical height as the center region of the first input color plane, wherein the scaled peripheral region comprises a scaled rectangular side edge subregion horizontally aligned with the center region of the output color plane and having the same vertical height as the center region of the output color plane, and wherein the scaled rectangular side edge subregion is generated by scaling the rectangular side edge subregion in a horizontal direction without scaling the rectangular side edge subregion in a vertical direction.

6. The display driver IC of claim 5, wherein the scaled rectangular side edge subregion is in contact with a side edge of the center region of the output color plane, and wherein a scaling origin used in scaling the rectangular side edge subregion to generate the scaled rectangular side edge subregion is positioned at a midpoint of the side edge of the center region of the output color plane.

7. The display driver IC of claim 3, wherein the peripheral region of the first input color plane comprises a rectangular top edge subregion having the same horizontal width as the center region of the first input color plane and vertically aligned with the center region of the first input color plane, wherein the scaled peripheral region comprises a scaled rectangular top edge subregion having the same horizontal width as the center region of the output color plane and vertically aligned with the center region of the output color plane, and wherein the scaled rectangular top edge subregion is generated by scaling the rectangular top edge subregion in a vertical direction without scaling the rectangular top edge subregion in a horizontal direction.

8. The display driver IC of claim 7, wherein the scaled rectangular top edge subregion is in contact with a top edge of the center region of the output color plane, and wherein a scaling origin used in scaling the rectangular top edge subregion to generate the scaled rectangular top edge subregion is positioned at a midpoint of the top edge of the center region of the output color plane.

9. The display driver IC of claim 3, wherein the peripheral region comprises a rectangular corner subregion positioned adjacent to a first corner of the center region of the first input color plane, wherein the scaled peripheral region comprises a scaled rectangular corner subregion positioned adjacent to a second corner of the center region of the output color plane, and wherein the scaled rectangular corner subregion is generated by scaling the rectangular corner subregion in both of a horizontal direction and a vertical direction.

10. The display driver IC of claim 9, wherein a scaling origin used in scaling the rectangular corner subregion to generate the scaled rectangular corner subregion is positioned at the second corner of the center region of the output color plane.

11. The display driver IC of claim 1, wherein the output color plane comprises a plurality of horizontal lines each comprising pixels arrayed in a first direction corresponding to a horizontal direction of the display panel, and wherein a scale factor used in scaling the peripheral region of the first input color plane to generate the scaled peripheral region is constant in determining grey levels of the pixels in each of the plurality of horizontal lines of the output color plane.

12. The display driver IC of claim 1, wherein the CAC circuit is further configured to receive for a second input color plane corresponding to a single second color different than the first color, and wherein updating the display panel is further based on the second input color plane without scaling of the second input color plane.

13. The display driver IC of claim 1, wherein scaling the values of the first color for respective pixels in the peripheral region comprises scaling pixel grey levels of the first color for respective pixels in the peripheral region.

14. The display driver IC of claim 1, wherein the CAC circuit is further configured to receive a second input color plane corresponding to a single second color different than the first color and generate a second output color plane based on the second input color plane, wherein generating the second output color plane comprises scaling values of the second color for respective pixels in a region of the second input color plane;

wherein updating the display panel is further based on the second output color plane.

15. The display driver IC of claim 14, wherein the output color plane includes upscaling of the values of the first color, and wherein the second output color plane includes downscaling of the values of the second color.

16. A display device, comprising:
a display panel;
a lens disposed in front of the display panel;
a chromatic aberration correction (CAC) circuit configured to:
receive a first input color plane corresponding to a single color,
wherein the single color is a first color, and the first input color plane comprises:
a center region; and
a peripheral region that surrounds the center region of the first input color plane; and
generate an output color plane comprising:
a center region that is the same as the center region of the first input color plane; and
a scaled peripheral region that surrounds the center region of the output color plane, the scaled peripheral region being generated by scaling values of the first color for respective pixels in the peripheral region; and
a drive circuit configured to update a display panel based on the output color plane.

17. The display device of claim 16, wherein scaling the peripheral region is based on chromatic aberration of the lens.

18. The display device of claim 16, wherein the center regions of the first input color plane and the output color plane are rectangular.

19. The display device of claim 18, wherein the peripheral region of the first input color plane comprises a plurality of rectangular peripheral subregions,
wherein the scaled peripheral region of the output color plane comprises a plurality of scaled rectangular peripheral subregions, and
wherein each of the plurality of scaled rectangular peripheral subregions is generated by scaling a corresponding one of the plurality of rectangular peripheral subregions in one or both of a first direction and a second direction, the first direction corresponding to a horizontal direction of the display panel and the second direction being perpendicular to the first direction.

20. The display device of claim 16, wherein the output color plane comprises a plurality of horizontal lines each comprising pixels arrayed in a first direction corresponding to a horizontal direction of the display panel, and
wherein a scale factor used in scaling the peripheral region of the first input color plane to generate the scaled peripheral region is constant in determining grey levels of the pixels in each of the plurality of horizontal lines of the output color plane.

21. The display device of claim 16, wherein the CAC circuit is further configured to receive a second input color plane corresponding to a single second color different than the first color, and
wherein updating the display panel is further based on the second input color plane without scaling of the second input color plane.

22. A method, comprising:
receiving, by a display driver integrated circuit (IC), a first input color plane corresponding to a single color, wherein the single color is a first color, and the first input color plane comprises:
a center region; and
a peripheral region that surrounds the center region of the first input color plane:
generating, by the display driver IC, an output color plane comprising:
a center region that is the same as the center region of the first input color plane; and
a scaled peripheral region that surrounds the center region of the output color plane, the scaled peripheral region being generated by scaling values of the first color for respective pixels in the peripheral region; and
updating, by the display driver IC, a display panel based on the output color plane.

23. The method of claim 22, wherein scaling the peripheral region is based on chromatic aberration of a lens disposed in front of the display panel.

* * * * *